(No Model.)
CHER POMPÉE DE BONDINI.
OVEN.
No. 281,620. Patented July 17, 1883.
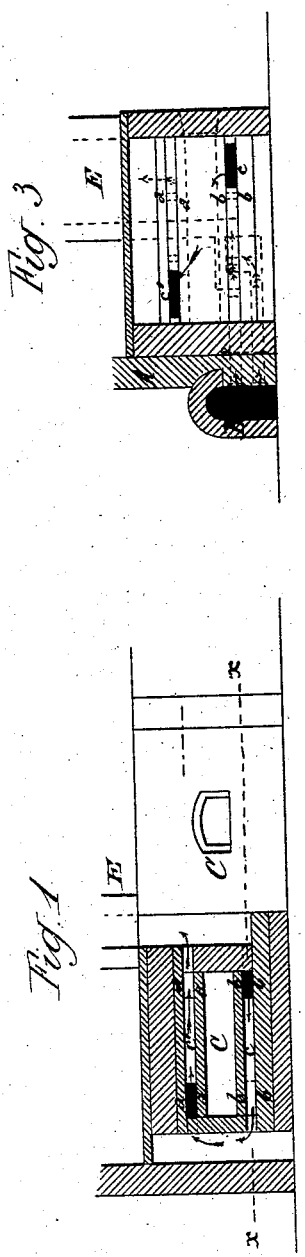
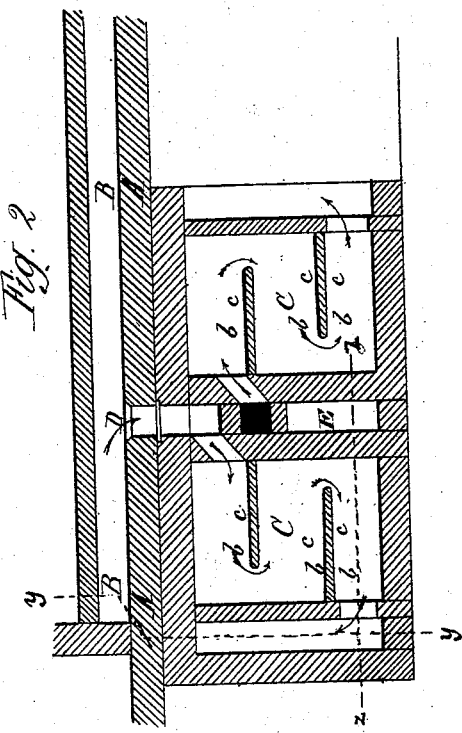
WITNESSES:
C. J. Hedrick
INVENTOR:
Cher Pompée de Bondini
By his Attorney
A. Pollok

UNITED STATES PATENT OFFICE.

CHER POMPÉE DE BONDINI, OF CONSTANTINOPLE, TURKEY.

OVEN.

SPECIFICATION forming part of Letters Patent No. 281,620, dated July 17, 1883.

Application filed February 26, 1883. (No model.) Patented in France February 7, 1882, No. 147,241; in Belgium August 5, 1882, No. 58,690; in England August 5, 1882, No. 3,754, and in Italy August 11, 1882.

*To all whom it may concern:*

Be it known that I, CHER POMPÉE DE BONDINI, of Constantinople, Turkey, have invented a new and useful Improvement in Ovens, of which the following specification is a full description.

This invention has for its object to utilize the great quantity of heat usually lost in gas-works for the manufacture of illuminating-gas; and it consists, first, in heating with the hot waste gases—such as the products of combustion from the retort-furnaces—ovens for baking bread, and other like industrial apparatus for baking, drying, and similar purposes involving the use of heat.

It further comprises a special construction of oven—to wit, an oven with flues surrounding the baking or receiving chamber, or a series of such chambers, and connected with a conduit for conveying the hot gases thereto from a distance, and a chimney for carrying off the same after they have circulated through the flues.

The accompanying drawings represent an oven constructed in accordance with the invention, Figure 1 being a view half in vertical section and half in elevation; Fig. 2, a horizontal section on line $x\ x$, Fig. 1; and Fig. 3, a vertical section on line $y\ y$, Fig. 2. The section in Fig. 1 is on line $z\ z$, Fig. 2.

A is the wall of a gas-works, behind which the retorts and retort-furnaces, of ordinary or suitable construction, are placed. In the said wall A is formed a conduit, B, which receives the products of combustion and other hot gases from the gas-works.

E is a chimney or uptake, which receives the said gases after they have heated the ovens. The baking or receiving chambers C (of which two are shown, but of which a considerably larger number would ordinarily be employed) have flues $c\ c$ in the top and bottom, between the walls $a\ a$ and $b\ b$, respectively. These flues receive the hot gases from the conduit B through the opening D and deliver them into the uptake E. As shown, there are two ovens on opposite sides of the common chimney or uptake E, and receiving the gases through inlets D in the wall between them. Obstructions are shown in the flues, so as to cause the gases to pursue a tortuous course. There may be several tiers of ovens, if desired, the upper tiers receiving the gases from the lower ones, or being supplied by separate conduits or separate connections with a common conduit. The arrows indicate the direction of the gases. Instead of placing the ovens in the position indicated, they could be placed above the retort-furnaces, with an independent bottom resting upon the walls between the retort-furnaces, the mouths of the ovens being behind the wall of the gas-works. This source of heat is especially adapted to the heating of the long-tunnel ovens for the baking of biscuits. Since gas-works continue day and night throughout the year, there is a permanent source of heat for the ovens at all times without expense for fuel or for attendance on the fires.

I claim—

1. A baking-oven or similar apparatus heated by the waste heat from gas-works or other works wherein a high degree of heat is continuously produced, the said oven or apparatus comprising a series of horizontal closed receiving-chambers surrounded with heating-flues, and being combined with a conduit for conveying the hot gases from the retort-furnaces and to said flues, and a chimney or uptake for carrying off the said gases after circulating through the flues, substantially as described.

2. The series of horizontal chambers and their surrounding flues, in combination with the horizontal conduit transverse to the length of said chambers for delivering the hot waste gases into said flues, and one or more chimneys or uptakes for carrying off the same after circulating around the receiving-chambers, substantially as described.

In witness whereof I have hereunto signed my name in the presence of two subscribing witnesses.

C. POMPÉE DE BONDINI.

Witnesses:
 EDWIN M. BLISS,
 D. N. DEMETRIADES.